United States Patent
Mizuno et al.

(10) Patent No.: US 9,762,122 B2
(45) Date of Patent: Sep. 12, 2017

(54) LOAD DRIVE CONTROLLING DEVICE

(71) Applicant: DENSO CORPORATION, Kariya, Aichi-pref. (JP)

(72) Inventors: Yuuta Mizuno, Anjo (JP); Fumihiko Nakane, Nishio (JP); Fuminori Suzuki, Okazaki (JP); Hiromitsu Nagata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 364 days.

(21) Appl. No.: 14/491,067

(22) Filed: Sep. 19, 2014

(65) Prior Publication Data
US 2015/0088320 A1 Mar. 26, 2015

(30) Foreign Application Priority Data

Sep. 23, 2013 (JP) ................................. 2013-196330

(51) Int. Cl.
*H02M 3/156* (2006.01)
*G05D 7/06* (2006.01)
*H02M 3/155* (2006.01)

(52) U.S. Cl.
CPC .... *H02M 3/156* (2013.01); *H02M 2003/1555* (2013.01)

(58) Field of Classification Search
CPC .......... H02M 3/156; H02M 2003/1555; G05D 7/0635; H02J 1/06

(Continued)

(56) References Cited

U.S. PATENT DOCUMENTS 6,676,230 B2 * 1/2004 Kuno ........................ B60T 8/36
303/114.3
2003/0045981 A1 * 3/2003 Kifuku ................. B62D 5/0469
701/41

(Continued)

FOREIGN PATENT DOCUMENTS

JP H4-313108 A 11/1992
JP H9-174642 A 7/1997

(Continued)

OTHER PUBLICATIONS

Takayoshi et al, "JP 2002-182759 Current Controller for inductive Load", Jun. 26, 2002, JPAT Machine Translation, pp. 7.*

(Continued)

*Primary Examiner* — Miranda Huang
*Assistant Examiner* — Olvin Lopez Alvarez
(74) *Attorney, Agent, or Firm* — Posz Law Group, PLC (57) ABSTRACT

A load drive controlling device includes a dulling controller, a dulling adjuster, and a Proportional Integral (PI) controller. The dulling adjuster sets a first electric current value for a dulling adjustment operation according to a change trend of a target electric current value in an inductive load. The dulling adjuster performs the dulling adjustment operation on the first electric current and limits a dulled value based on a guard value. The PI controller performs a PI control based on a deviation between the dulled value and an actual value of the electric current. The dulling controller sets the first electric current value and the guard value according to a change trend of the target electric current value. In such a configuration, the load drive controlling device improves an electric current response while preventing an over-accumulation of an integration value.

7 Claims, 10 Drawing Sheets (58) Field of Classification Search
USPC .......................................... 700/282; 323/284
See application file for complete search history.

(56) References Cited

U.S. PATENT DOCUMENTS

| | | | | |
|---|---|---|---|---|
| 2004/0100216 | A1* | 5/2004 | Makaran | H02P 29/02 318/434 |
| 2008/0238391 | A1* | 10/2008 | Williams | H01F 7/1844 323/283 |
| 2013/0066524 | A1* | 3/2013 | Kitazume | B62D 5/0463 701/42 |
| 2013/0093402 | A1* | 4/2013 | Akahane | H02M 3/158 323/234 |
| 2013/0221879 | A1* | 8/2013 | Yokokawa | H02P 21/22 318/400.02 |
| 2013/0327423 | A1* | 12/2013 | Kanzaki | F16H 61/061 137/487.5 |
| 2014/0375290 | A1* | 12/2014 | Mizuno | H02M 3/156 323/282 |

FOREIGN PATENT DOCUMENTS

| | | |
|---|---|---|
| JP | 11-037258 A | 2/1999 |
| JP | 2002-182759 A | 6/2002 |
| JP | 2006-170259 A | 6/2006 |
| JP | 2010-288033 A | 12/2010 |

OTHER PUBLICATIONS

Masao et al, "JP H9-174642 Adjustable-Speed Control Method in Injection Molding Machine", Jul. 8, 1997, JPAT Machine Translation, pp. 7.*

Mitsuyoshi, "JP H4-313108 Reactive Power Compensating Device", Nov. 5, 1992, JPAT Machine Translation, pp. 4.*

Hiroyasu, "JP 2010-288033 PWM Control Solenoid Driver and Semiconductor Integrated Circuit Device", Dec. 24, 2010, JPAT Machine Translation, pp. 8.*

Office Action mailed Sep. 8, 2015 in the corresponding JP application No. 2013-196330 (with English translation), pp. 6.

* cited by examiner

LOAD DRIVE CONTROLLING DEVICE

CROSS REFERENCE TO RELATED APPLICATION

The present application is based on and claims the benefit of priority of Japanese Patent Application No. 2013-196330, filed on Sep. 23, 2013, the disclosure of which is incorporated herein by reference.

TECHNICAL FIELD

The present disclosure generally relates to a load drive controlling device which controls a drive of inductive load, and relates more specifically to a load drive controlling device which performs a dulling process of a target electric current value.

BACKGROUND INFORMATION

Conventionally, based on the deviation between the target electric current value and the actual electric current value, which is an actual electric current value of a solenoid, a certain control device may perform a feedback control, such as, a Proportional Integral (PI) control, which is an adjustment process of the electric current flowing in the solenoid by a proportional operation and an integration operation.

In such a PI control, when the proportional gain and/or the integration gain are raised, the actual electric current value tends to overshoot the target electric current value while responsiveness is increased. Such an overshooting is caused because, in view of the deviation between the actual electric current value and the target electric current value, the electric current value is overly accumulated to have an overly-integrated value.

On the other hand, according to the patent document 1 (i.e., Japanese Patent Publication of 2002-182759), a method for performing an adjustment of the target electric current value is described. The described method is capable of changing the target electric current value according to the rise/fall characteristic of the actual electric current value, and is capable of preventing an over-accumulation of the integration value.

However, according to the conventional method, when the target electric current value is adjusted, the adjustment is always the same regardless of the target electric current value or the amount of change of an electric current value. In other words, a convergence time of the target electric current after the adjustment is constant regardless of the amount of change of the target electric current value. Therefore, the adjustment control in response to a small change of the target electric current, which is hard to overshoot, may be delayed according to the conventional method. In other words, if an adjustment control is set to be valid for a large amount of change of the target electric current value, the convergence time of such adjustment is too long for the small amount of change of the target electric current value.

Further, the actual electric current flowing in the solenoid is quick to rise in a low current region and becomes slow to rise when a current region shifts toward a high current region. Therefore, an always-the-same adjustment described above leads to a delayed response especially in the low current region. In other words, if a standard response time is set for the high current region, such a standard response time is too long for the low current region.

SUMMARY

It is an object of the present disclosure to provide a load drive controlling device which is capable of improving responsiveness of the electric current dulling adjustment, while preventing an over-accumulation of an integration value of the electric current.

In an aspect of the present disclosure, a load drive controlling device for controlling a drive of an inductive load includes a switch driven at a preset duty to control an electric current that flows in the inductive load, an actual electric current value detector that detects an actual electric current value flowing in the inductive load, and a dulling controller that sets a first electric current value for a dulling adjustment operation based on a change trend between a previous value and a current moment value of a target electric current of the inductive load and sets the current moment value of the target electric current as a guard value. The load drive controlling device also includes a dulling adjuster that performs the dulling adjustment operation on the first electric current value and limits a dulled value based on the guard value, and a PI controller that performs a Proportional Integral control based on a deviation between the dulled value that is output from the dulling adjuster and the actual electric current value and sets the preset duty. As such, when the change trend of the target electric current value is increasing, a value greater than the current moment value of the target electric current is set as the first electric current value, allowing an increase of the first electric current value to increase to a maximum electric current value that is a 100% duty target electric current value, and the guard value is set as an upper limit value of the dulled value. Further, when the change trend of the target electric current value is decreasing, a value smaller than the current moment value of the target electric current is set as the first electric current value, allowing a decrease of the first electric current value to decrease to a minimum electric current value that is a 0% duty target electric current value, and the guard value is set as a lower limit value of the dulled value.

According to the above, instead of dulling (i.e., rounding or smoothly converging) toward the target electric current value, when the change trend of the target electric current value is an increase, for example, the dulling operation is performed toward the first electric current value that is greater than the target electric current value. Therefore, the rise of the electric current in such dulling becomes quicker, in comparison to the dulling toward the target electric current value. Further, the current moment value of the target electric current is used as the guard value, the dulled value converges toward the current moment value of the target electric current. Therefore, when the target electric current value is changed, the convergence time of the dulled value toward the target electric current value is decreased. That is, such a configuration improves an electric current responsiveness in comparison to the target electric current value dulling configuration.

Thereby, a delay of response is prevented when a small change is caused in the target electric current in which an overshooting or undershooting of the electric current is not likely. Further, the prevention of a delay of response is noticeable especially in a low electric current region.

Further, the dulling operation prevents an over-accumulation of the integration value in comparison to the no-dulling operation configuration. In other words, overshooting and undershooting of the electric current are prevented.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, embodiments of the present disclosure are described with reference to the drawings. The same numerals are assigned to the same/like element in each of those embodiments.

First Embodiment

First, a load drive controller 10 concerning the present embodiment and a drive of an inductive load driven by such controller are described.

Figure 1:
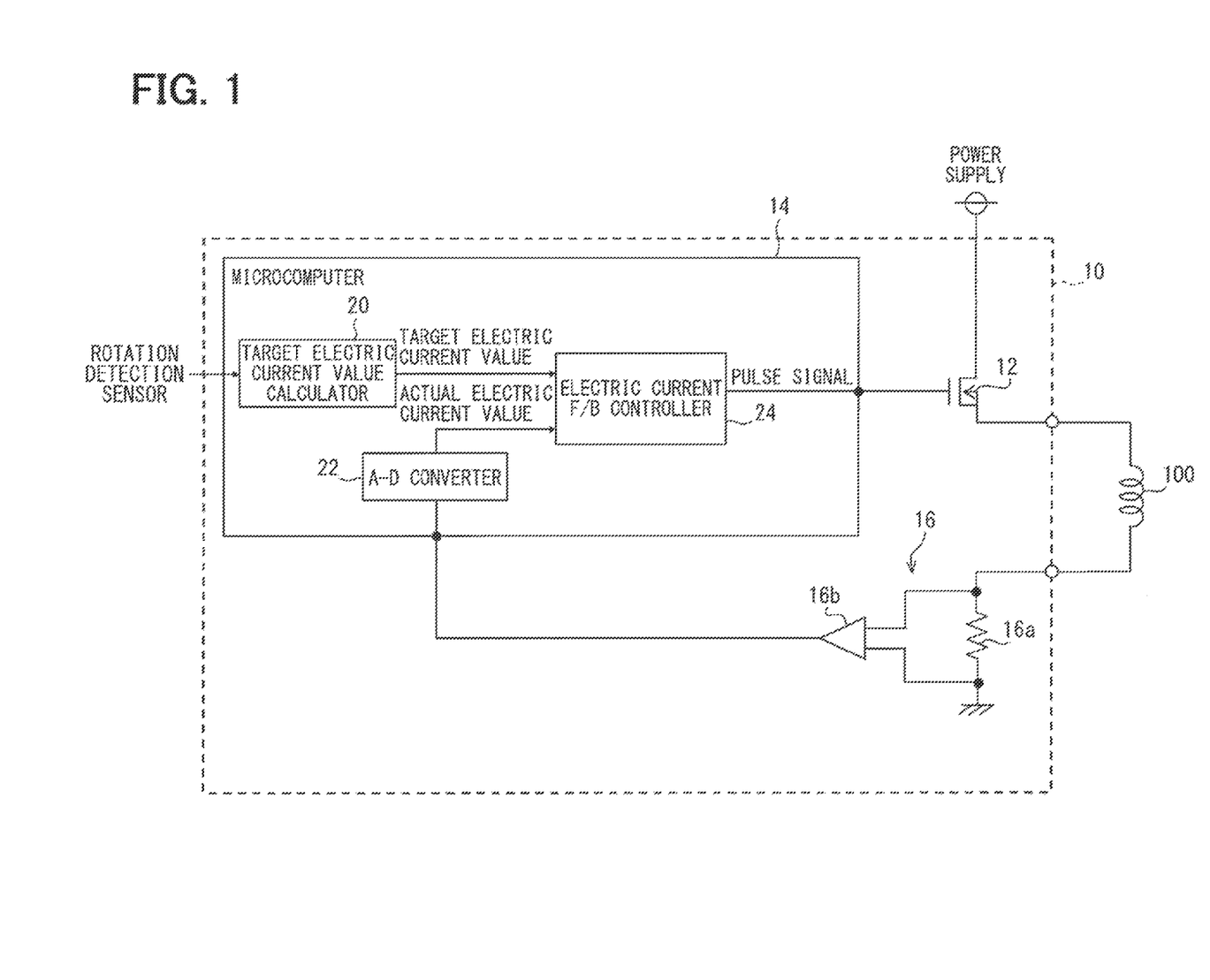
FIG. 1 is a schematic diagram of a load drive controlling device in a first embodiment of the present disclosure.

According to the present embodiment, as shown in FIG. 1, a linear solenoid 100 of an oil pressure valve is adopted as an inductive load. As an example, the linear solenoid 100 is used to control an engagement of a clutch and an opening of the clutch by using an oil pressure and to shift an automatic transmission in a vehicle to a target gear range.

The linear solenoid 100 has a coil and a plunger, and an operation of the plunger and an operation of a spool that is connected to the plunger are controlled through a control of the power supply to the coil.

Next, an outline configuration of the load drive controller 10 is described with reference to FIG. 1.

As shown in FIG. 1, the load drive controller 10 is provided with a switch 12, a microcomputer 14, and a current detector 16 for detecting an electric current.

The switch 12 is provided on a power supply route of the linear solenoid 100, and a PWM control of switching ON and OFF is performed according to a pulse signal from the microcomputer 14. When the switch 12 is switched ON, an electric power is supplied for the linear solenoid 100, and when the switch 12 is switched OFF, the supply of the electric power for the solenoid 100 is interrupted.

According to the present embodiment, MOSFET is adopted as the switch 12, and the switch 12 is provided on an upstream side relative to the linear solenoid 100. When a pulse signal is input as a gate signal to MOSFET, switching ON/OFF of the switch 12 according to such pulse signal is performed.

The microcomputer 14 is configured to have CPU, ROM, RAM, a register, and the like. Various kinds of data processing are performed in the microcomputer 14, in which CPU uses RAM and the register as a temporary storage area for executing a program that is memorized by ROM according to an input signal inputted thereto. The details of the microcomputer 14 are mentioned later.

The current detector 16 has a resistor 16a connected in series to the linear solenoid 100 for detecting an electric current and an operational amplifier 16b which amplifies a voltage applied to both ends of the resistor 16a and outputs the amplified voltage to the microcomputer 14. The current detector 16 is equivalent to an actual electric current value detector in the claims.

As for the resistor 16a, one end of the resistor 16a is connected to a downstream end terminal of the linear solenoid 100, and the other end of the resistor 16a is grounded. Thus, a voltage between both ends of the resistor 16a is configured to be proportional to the electric current flowing in the linear solenoid 100 (i.e., proportional to an actual electric current value).

As for the operational amplifier 16b, a positive input terminal of the amplifier 16b is electrically connected to an upstream side terminal of the resistor 16a, and a negative input terminal of the amplifier 16b is electrically connected to a downstream side terminal of the resistor 16a. An output terminal of the operational amplifier 16b is electrically connected to the microcomputer 14. Thus, the operational amplifier 16b is configured to amplify the voltage between both ends of the resistor 16a and to output it to the microcomputer 14.

Next, an outline configuration of the microcomputer 14 is described with reference to FIG. 1.

The microcomputer 14 is provided with a target electric current value calculator 20, an A-D converter 22, and an electric current F/B controller 24 as shown in FIG. 1.

The target electric current value calculator 20 computes an electric current value which should be supplied to the linear solenoid 100, i.e., a target electric current value, in order to achieve a target state of the linear solenoid 100 which is a control object of the load drive controller 10. According to the present embodiment, the target electric current value is computed based on the so signals inputted from a rotation detection sensor which detects the rotation number of an input side of the automatic transmission and a rotation detection sensor which detects the rotational number of an output side of the automatic transmission.

The target electric current value calculator 20 detects the rotation number of the input side and the output side of the automatic transmission, based on the signal inputted from the rotation detection sensor. Then, based on the rotation number of the input side and the rotation number of the output side, a target oil pressure which should be applied to the automatic transmission is computed.

Next, the target electric current value calculator 20 computes the target electric current value as an electric current value which should be supplied to the linear solenoid 100 based on the computed target oil pressure. A relationship between the target oil pressure and the target electric current value is pre-defined, for example, and is stored in ROM of the microcomputer 14 as a map. The target electric current value calculator 20 computes the target electric current value from the target oil pressure based on the predetermined relationship between the target oil pressure and the target electric current value.

The A-D converter 22 is configured to have its input terminal electrically connected to an output terminal of the operational amplifier 16b. The A-D converter 22 performs an A/D conversion of the input signal, i.e., the actual electric current value, from the operational amplifier 16b, and outputs it to the electric current F/B controller 24.

The electric current F/B controller 24 generates a pulse signal for performing a PWM control of the switch 12 based on the above-mentioned target electric current value and the actual electric current value. Then, the controller 24 outputs a pulse signal to the above-mentioned switch 12.

Figure 2:
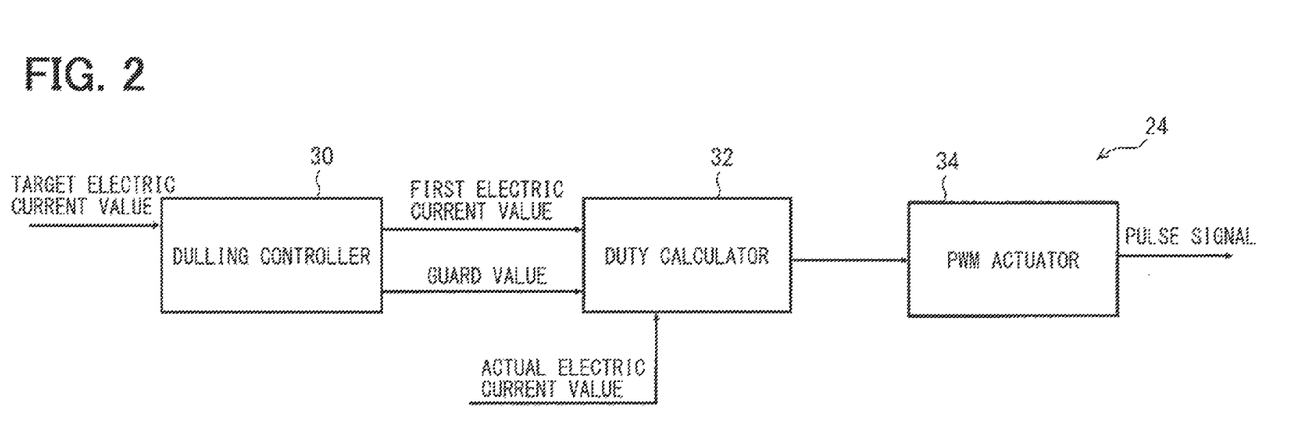
FIG. 2 is a schematic diagram of an electric current F/B controller in FIG. 1.

Next, with reference to FIG. 2, an outline configuration of the electric current F/B controller 24 is described.

As shown in FIG. 2, the electric current F/B controller 24 is provided with a dulling controller 30, a duty calculator 32, and a PWM actuator 34.

The dulling controller 30 obtains a target electric current value from the target electric current value calculator 20, and sets a first electric current value for dulling adjustment (i.e., dulling operation) and a guard value that limits a dulled value of the first electric current value. The details of such setting are mentioned later.

The duty calculator 32 performs a dulling process based on the first electric current value that is set by the dulling controller 30 and the guard value, and generates a target electric current value after dulling operation (i.e., a dulled target electric current value). Further, the duty calculator 32 computes a duty ratio for performing a F/B control of the linear solenoid 100 based on the deviation between the dulled target electric current value and the actual electric current value that is inputted from the A-D converter 22, so that the actual electric current value follows the dulled target electric current value. Then, the computed duty ratio is output to the PWM actuator 34. The duty ratio output to the PWM actuator 34 is saved in the register. The details of the duty calculator 32 are mentioned later.

The PWM actuator 34 outputs a pulse signal for controlling a drive of the switch 12. Although the PWM actuator 34 is not illustrated, it is provided with a register for data storage which specifies a pulse signal to be output. In this register, the duty ratio inputted from the duty calculator 32 and a generation cycle of the pulse signal are stored. Therefore, the PWM actuator 34 outputs the pulse signal according to the duty ratio and the generation cycle which are stored in the register.

Figure 3:
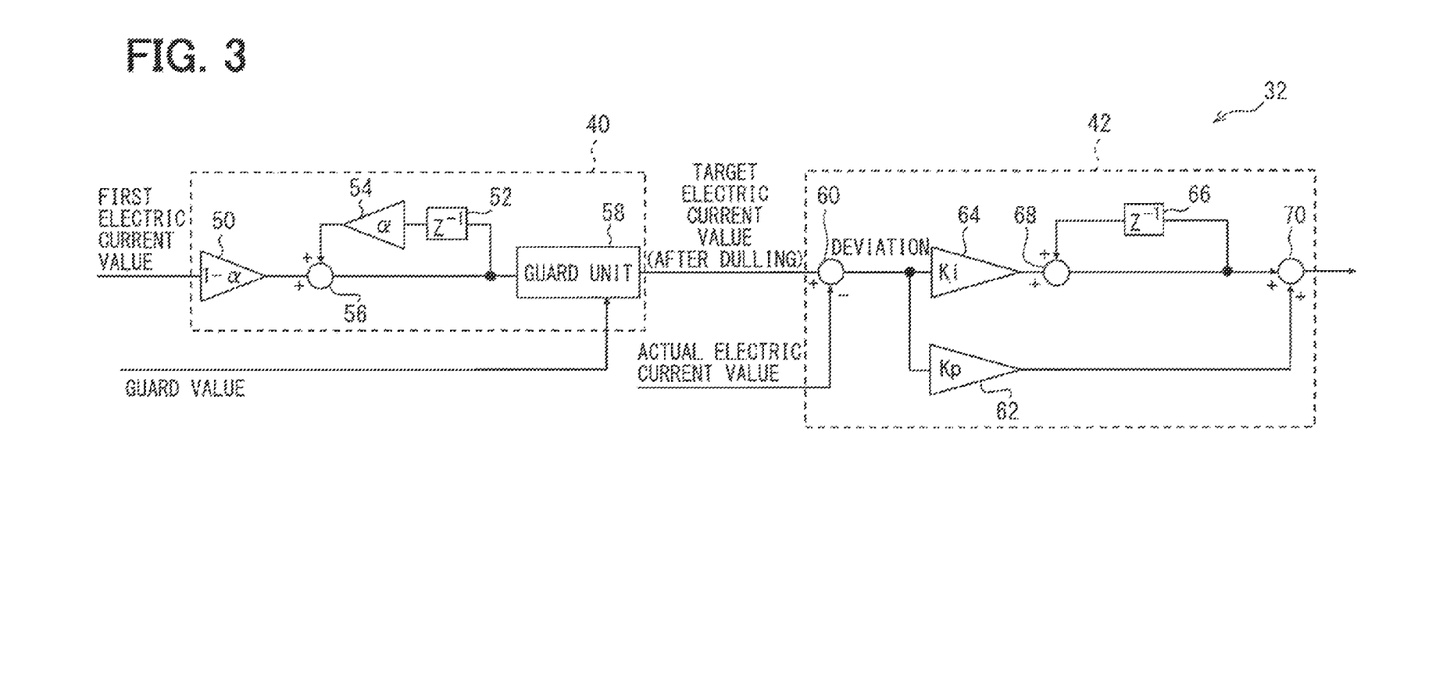
FIG. 3 is a schematic diagram of a duty calculation unit in FIG. 2.

Next, with reference to FIG. 3, an outline configuration of the duty calculator 32 is described.

As shown in FIG. 3, the duty calculator 32 is provided with a dulling adjuster 40 that performs the dulling process on the target electric current value and a PI (Proportional Integral) controller 42 that computes a duty ratio based on the deviation between the dulled target electric current value and the actual electric current value.

The dulling adjuster 40 is provided as a low-pass filter which utilizes a sum of the geometric series, for example. Specifically, it has a multiply unit 50 which multiplies the first electric current value in a (1−alpha) fold, a delay unit 52 which obtains a previous output (i.e., an output of a previous process), a multiply unit 54 which multiplies the output of the delay unit 52 in an a fold, and an adder unit 56 which adds the output of multiply unit 50 to the output of the multiply unit 54. Therefore, when the first electric current value is designated as $X_k$ and the output value is designated as $Y_k$, the currently-output value $Y_k$ (i.e., a current moment value in the claims) will be designated as $Y_k=(1-\text{alpha})X_k+\alpha Y_{k-1}$.

The dulling adjuster 40 has a guard unit 58. The guard unit 58 applies restriction to the above-mentioned output value $Y_k$ based on the guard value. For example, when the target electric current value is increasing, the currently-output value of the target electric current is set as the guard value defining a maximum of the output value $Y_k$. Therefore, when the target electric current value is increasing, the output value $Y_k$ is output as it is as the dulled target electric current value until the output value $Y_k$ reaches the currently-output value of the target electric current, and after the reaching of the output value $Y_k$ to the currently-output value of the target electric current, the currently-output value of the target electric current is output as the dulled target electric current.

Similarly, when the target electric current value is decreasing, the target electric current value is set as the guard value defining a minimum of the output value $Y_k$. Therefore, when the target electric current value is decreasing, the output value $Y_k$ is output as it is as the dulled target electric current value until the output value $Y_k$ reaches the currently-output value of the target electric current, and after the reaching of output value $Y_k$ to the currently-output value of the target electric current, the currently-output value of the target electric current is outputted as the dulled target electric current value. Further, the dulled target electric current value is equivalent to a dulled value that is output from the dulling adjuster 40 in the claims.

The PI controller 42 has the same configuration as a well-known conventional PI controller. That is, the PI controller 42 has a deviation calculator 60 which computes a deviation between the dulled target electric current value and the actual electric current value, and has, as a proportional operation unit, a multiply unit 62 which multiplies the computed deviation in Kp fold, Kp being a proportion constant. The PI controller 42 also has, as an integration operation unit, a multiply unit 64 which multiplies the deviation in Ki fold, Ki being an integration constant, a delay unit 66 which obtains a previous output of the integration operation unit, and an adder unit 68 which adds the output of the multiply unit 64 and the output of the delay unit 66.

Further, the PI controller 42 has an adder unit 70 which adds the output of the above-mentioned proportional operation unit to the output of the integration operation unit. Then, a result of the addition by the adder unit 70 is output to the PWM actuator 34 as a duty ratio.

Figure 4:
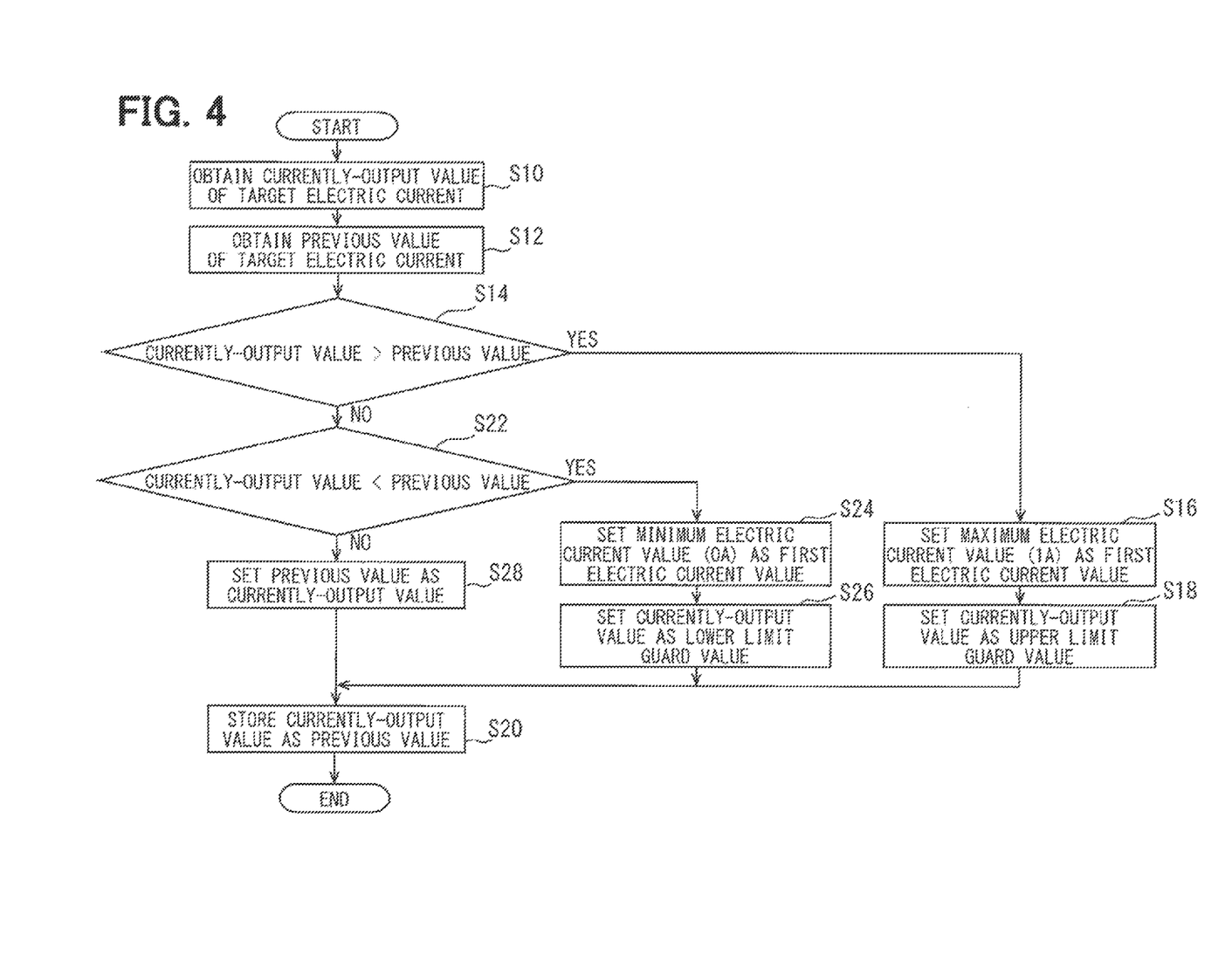
FIG. 4 is a flowchart of a process that is performed by a dulling controller in FIG. 2.

Next, with reference to FIG. 4, a process performed by the dulling controller 30 is described.

The dulling controller 30 repeatedly performs the process described below at a predetermined cycle, while the power supply of the microcomputer 14 is switched ON.

As shown in FIG. 4, the dulling controller 30 obtains the target electric current value inputted from the target electric current value calculator 20 in the first place. That is, the currently-output value of the target electric current is obtained (S10). Next, the dulling controller 30 obtains the previous value of the target electric current memorized by RAM (S12).

Then, the dulling controller 30 determines whether the currently-output value of the target electric current is greater than the previous value of the target electric current, i.e., whether the target electric current value is increasing (S14). When it is determined in S14 that the currently-output value of the target electric current is greater than the previous value, the dulling controller 30 sets the maximum electric current value as the first electric current value that is output to the dulling adjuster 40, and outputs the set value to the dulling adjuster 40 (S16). The maximum electric current value is a target electric current value at a 100% duty, and is 1 [A] in the present embodiment. The maximum electric current value is pre-stored in ROM.

Subsequently, the dulling controller 30 sets the currently-output value of the target electric current obtained in S10 as an upper limit guard value from among the guard values which are to be output to the dulling adjuster 40, and outputs it to the dulling adjuster 40 (S18). A lower limit guard value is also set in S18. When the target electric current value is increasing, the lower limit guard value is not substantially used in the dulling process. Therefore, an invalid value, e.g., a minimum electric current value, is set as the lower limit guard value for not affecting to the process. The minimum electric current value in this case is a target electric current value at a 0% duty, and is 0 [A] in the present embodiment. The minimum electric current value is also pre-stored in ROM.

Subsequently, the dulling controller 30 stores the first electric current value and the guard value that are set in S16 and in S18, that is, the currently-output value from the dulling process, in RAM respectively as a previous value (S20). Then, the process comprising a series of steps concludes.

On the other hand, when it is determined in S14 that the currently-output value of the target electric current is not greater than the previous value of the target electric current, it is then determined by the dulling controller 30 whether the currently-output value of the target electric current is smaller than the previous value of the target electric current, that is, whether the target electric current value is decreasing (S22). When it is determined that the currently-output value of the target electric current is smaller in S22, the dulling controller 30 sets the minimum electric current value described above as the first electric current value that is output to the dulling adjuster 40, and outputs it to the dulling adjuster 40 (S24).

Subsequently, the dulling controller 30 sets the currently-output value of the target electric current obtained in S10 as the lower limit guard value from among the guard values which are to be output to the dulling adjuster 40, and outputs it to the dulling adjuster 40 (S26). Further, an upper limit guard value is also set in S26. When the target electric current value is decreasing, the upper limit guard value is not substantially used in the dulling process. Therefore, an invalid value, e.g., a maximum electric current value, is set as the upper limit guard value for not affecting the process.

Subsequently, the dulling controller 30 stores the first electric current value and the guard value that are set in S24 and in S26, that is, the currently-output value from the dulling process, in RAM respectively as a previous value (S20). Then, the process comprising a series of steps concludes.

Further, when the dulling controller 30 determines that the currently-output value of the target electric current is not smaller than the previous value of the target electric current in S22, that is, when the currently-output value of the target electric current is equal to the previous value of the target electric current in S22, the dulling controller 30 sets the previous value memorized in RAM, i.e., the previously-set first electric current value and the previously-set guard value, as the currently-output value, and outputs it to the dulling adjuster 40 (S28). Then, the dulling controller 30 stores the first electric current value and the guard value set in S28, i.e., the currently-output value, in RAM respectively as a previous value. Then, the process comprising a series of steps concludes.

Next, advantageous effects of the load drive controller 10 concerning the present embodiment are described.

Figure 5:
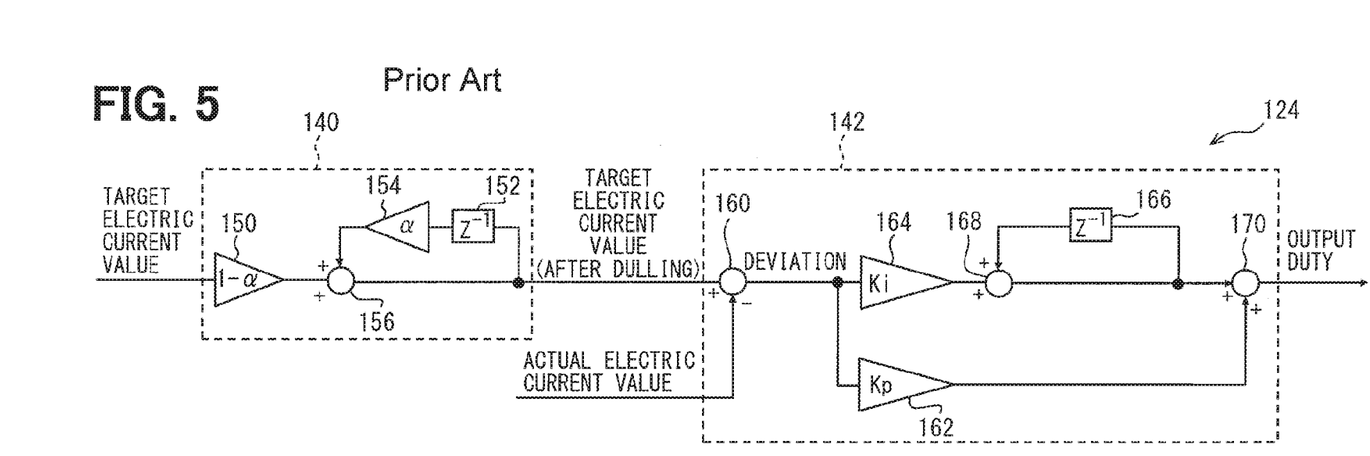
FIG. 5 is a schematic diagram of a conventional electric current F/B controller shown as a reference example.
Figure 6:
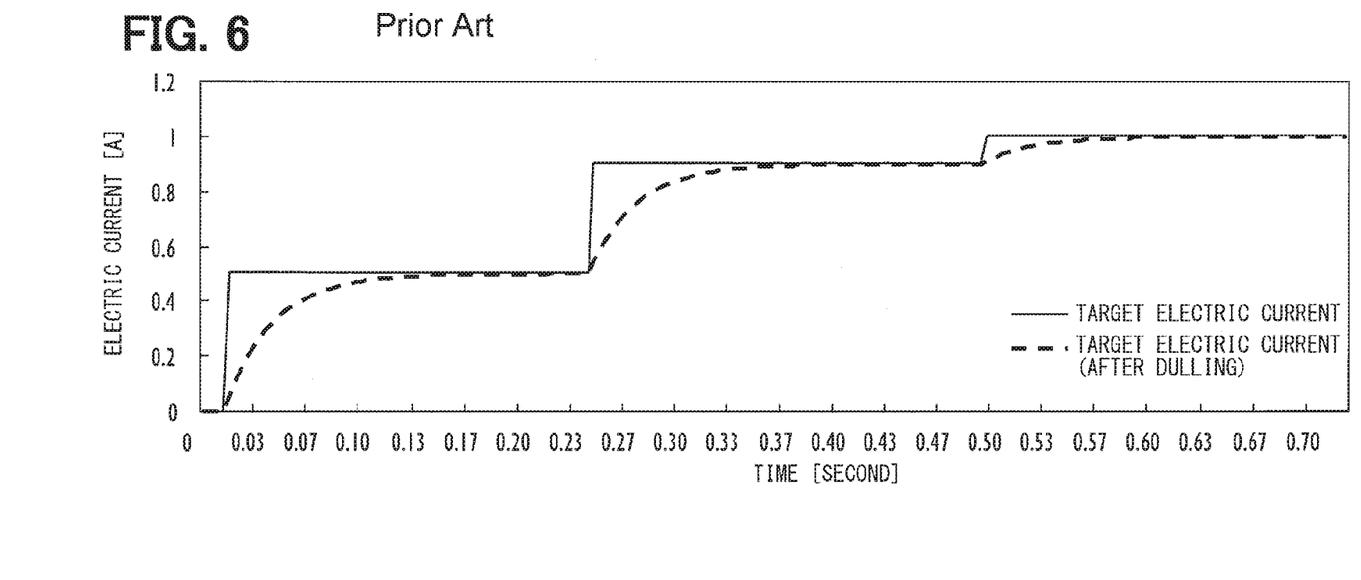
FIG. 6 is a graph of a dulling effect on a target electric current in the reference example of FIG. 5.

For explanation purpose, a conventional electric current F/B controller and a dulling process are described with reference to FIGS. 5 and 6, which serves as a reference example for a contrast with the present embodiment. In FIG. 5, the numerals are three-digit numbers, i.e., 100+ numbers, for the ease of comparison with the relevant element in the present embodiment.

In the reference example, as shown in FIG. 5, a conventional F/B controller 124 has a dulling unit 140 for dulling the target electric current value and a PI controller 142 for computing a duty ratio based on the deviation between the dulled target electric current value and the actual electric current value.

The dulling unit 140 is fundamentally same as the dulling adjuster 40 of the present embodiment, except for two points, that is, (i) the dulling of the target electric current value and (ii) the lack of the guard unit 58. This dulling unit 140 is, just like the dulling adjuster 40, configured to be serving as a low pass filter that utilizes the sum of the geometric series. Specifically, it has a multiply unit 150 which multiplies the target electric current value in a (1−alpha) fold, a delay unit 152 which obtains the previous output, a multiply unit 154 which multiplies the output of the delay unit 152 in a α fold, and an adder unit 156 which adds the output of the multiply unit 150 to the output of the multiply unit 154. Therefore, when a target electric current value is designated as $V_k$ and an output value is designated as $W_k$, the present output value $W_k$ designated as $W_K=(1-\text{alpha})V_k+\alpha W_{k-1}$.

The PI controller 142 has the same configuration as the PI controller 42 of the present embodiment. That is, it has a deviation calculator 160 which computes a deviation, and has, as a proportional operation unit, a multiply unit 162 which multiplies the computed deviation in Kp fold, Kp being a proportion constant. It also has, as an integration operation unit, a multiply unit 164 which multiplies the deviation in Ki fold, Ki being an integration constant, and a delay unit 166 which obtains the previous output of the integration operation unit, and an adder unit 168 which adds the output of the multiply unit 164 to the output of the delay unit 166. Further, it has an adder unit 170 which adds the output of the proportional operation unit to the output of an integration operation unit.

Thus, the dulling process by the conventional dulling unit 140 fills a gap (e.g., a deviation) between an input value (i.e., =a target electric current value $V_k$) and an output value $W_k$ by a preset ratio every time the conventional dulling process is performed. Therefore, as shown in FIG. 6, regardless of the amount of change of the target electric current and/or the target electric current value itself, the dulled target electric current value comes (i.e., is output) with a constant delay relative to the input of the target electric current value. Thus, in the example of FIG. 6, the convergence time of each of three changes, i.e., a change of 0 [A]→0.5 [A], a change of 0.5 [A]→0.9 [A], and a change of 0.9 [A]→1 [A], is substantially constant (i.e., approximately 0.13 seconds). In FIG. 6, a pre-dulling electric current value is drawn as a sold line, and a post-dulling (i.e., dulled) electric current value is drawn as a broken line.

On the other hand, the PI controller 142 sets in advance the proportion constant Kp, which is a feedback gain, and the integration constant Ki for the improvement of the responsiveness and for the shorter convergence time. However, the duty ratio is computed based on the dulled target electric current value, which inevitably influences the responsiveness due to a constant delay of the dulling process described above.

Figure 7:
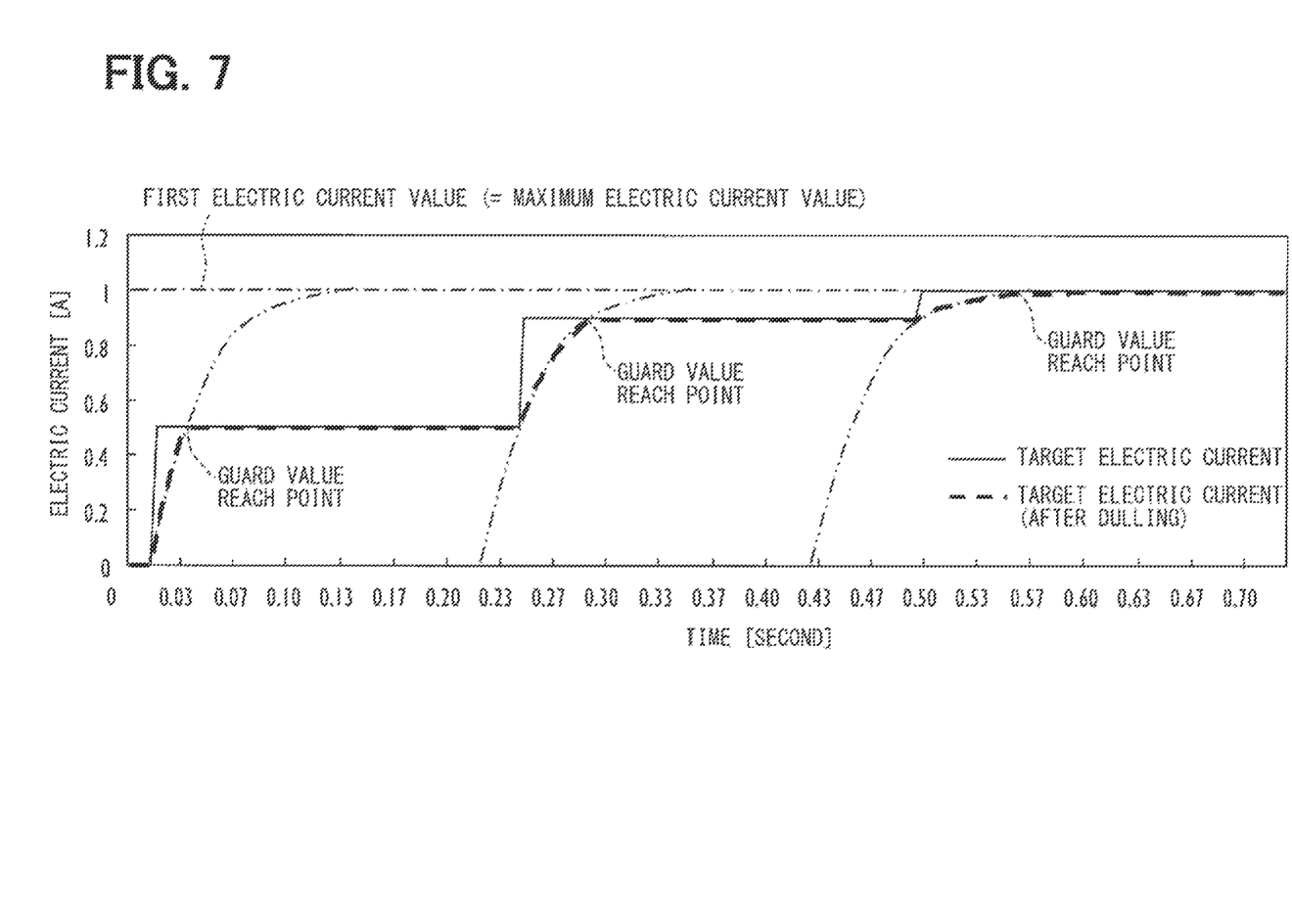
FIG. 7 is a graph of a dulling effect on the target electric current in the first embodiment.

In the present embodiment, in contrast, when the target electric current value is increasing, the maximum electric current value shown in FIG. 7 with a dashed dotted line is set as the first electric current value that is used in the dulling process. In such an adjustment process of the present embodiment, the output value approaches close to the first electric current value, as shown with a two-dot dashed line. That is, in the present embodiment, the rise of the dulled target electric current value on the two-dot dashed line is quicker than the rise of the same in the reference example in FIG. 6.

Further, according to the present embodiment, the currently-output value of the target electric current is set as a guard value. For example, as shown in FIG. 7, a change 0 [A]→0.5 [A] has an upper limit guard value of 0.5 [A]. Therefore, as shown in FIG. 7, the dulled target electric current value rises along the two-dot dashed line described above, and then forcedly converges to 0.5 [A], which is a guard value. In this case, a guard value reach point in FIG. 7 indicates a point where the dulled target electric current reaches a 0.5 [A] guard value.

Thus, according to the present embodiment, instead of adjusting the output toward the target electric current value, the adjustment operation is performed toward the maximum electric current value that is set as the first electric current value when a target electric current value is increasing. Therefore, the rise of the dulled target electric current value becomes quicker, in comparison to the dulling of the electric current value toward the target electric current value.

Further, the currently-output value of the target electric current is set as a guard value, which enables the convergence of the dulled target electric current value toward the currently-output value of the target electric current. That is, in the present embodiment, the responsiveness of the output is controlled by the first electric current value, and the convergence behavior of the output is controlled by the guard value. Therefore, even when the target electric current value changes, the convergence time of the output (i.e., the dulled target electric current) toward the after-change target electric current value is reduced. That is, the responsiveness of the electric current is improved compared with a configuration in which the dulling operation is performed toward the target electric current value. Such a distinction is apparent from the graphs in FIG. 6 and FIG. 7.

Such a configuration is beneficial for the prevention of the delayed response to a small change of the target electric current value that hardly induces an overshooting. Further, the actual electric current flowing in the linear solenoid 100 is quick to rise in the low electric current region, and the rise becomes slower as the electric current region shifts toward the high electric current value. Therefore, such a configuration is especially beneficial for the delayed response prevention in the low electric current region. In the present embodiment, a change 0 [A]→0.5 [A] and a change 0.5 [A]→0.9 [A] enjoy the improved electric current responsiveness.

Further, the adjustment operation is beneficial for the prevention of over-accumulation of the integration value, in comparison to a no-adjustment operation configuration. That is, an overshooting is prevented.

Further, a guard value is set for determining/controlling convergence time. Therefore, such control is prepared as an easy process, and an arithmetic load of the microcomputer 14 is reduced.

Further, the above description about a target electric current increase case is not the only one advantage of the present embodiment. That is, even when the target electric current is decreasing, the same advantage is expected. However, when the target electric current is decreasing, the responsiveness of the electric current is improved with the prevention of an under shoot.

Further, in the present embodiment, when a target electric current value is increasing, a maximum electric current value is set as the first electric current value. According to such a configuration, a wave form of the dulled target electric current has a similar wave form to an inductance curve of the linear solenoid 100. That is, the rise/fall characteristic of the dulled target electric current is almost the same as the characteristic of the actual electric current flowing in the linear solenoid 100. Therefore, the deviation between the dulled target electric current value and the actual electric current value is decreased, which is effectively reduces/prevents an over-accumulation of the integration value. Further, because the maximum electric current value is set as a maximum of the first electric current value and the minimum electric current value is set as a minimum of the first electric current value, the responsiveness of the electric current is improved to its limit.

Further, the maximum electric current value and the minimum electric current value are in advance memorized in ROM, the dulling controller 30 does not need to calculate the first electric current value by an arithmetic operation. Such a configuration also reduces the arithmetic load of the microcomputer 14.

Further, when the target electric current value is not changing, the dulling controller 30 sets the previous values of the first electric current value and the guard value respectively as the currently-output values. That is, the previous values are kept unchanged. Therefore, when the target electric current value is not changing, the dulled target electric current value is also set as a constant value.

Modification

In the above-mentioned embodiment, the usage region of the target electric current used for a control of the linear solenoid 100 is set to 0 [A]-1 [A], and an upper limit of the usage region matches the maximum electric current value. However, the maximum electric current value may be set as the first electric current value in a different configuration in which, for example, the usage to region is set to 0 [A]-1 [A], and the maximum electric current is set to 1.2 [A].

Further, in the above, as the first electric current value, the maximum electric current value is set when the target electric current value is increasing, or the minimum electric current value is set when the target electric current value is decreasing.

However, when the target electric current value is increasing, the present disclosure's advantage is achievable, as long as the first electric current value is set to a greater-than-currently-output value, with an upper limit of such setting capped by the maximum electric current value. When the target electric current value is decreasing, the present disclosure's advantage is achievable, as long as the first electric current value is set to a smaller-than-currently-output value, with a lower limit of such setting bottomed by the minimum electric current value.

Figure 8:
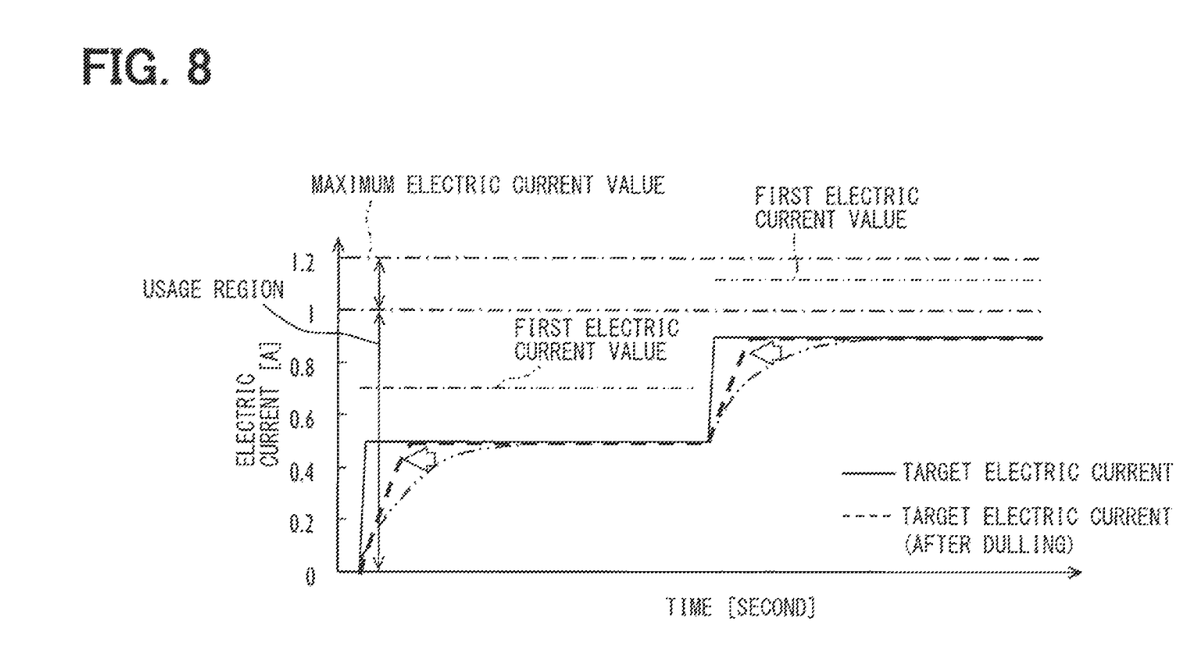
FIG. 8 is a graph of a first electric current value in a modification of the first embodiment.

In the example shown in FIG. 8, for a change 0 [A]→0.5 [A], a 0.7 [A] electric current that is greater than a 0.5 [A] electric current is set as the first electric current value, and, for a change 0.5 [A]→0.9 [A], a 1.1 [A] electric current that is greater than a 0.9 [A] electric current is set as the first electric current value. According to such a setting, the first electric current value is set to a greater-than-currently-output value of the target electric current, the responsiveness of the dulled target electric current is improved further than the dulling operation shown in FIG. 8, which is shown as a reference example with a two-dot dashed line. In FIG. 8, the usage region is set to 0 [A]-1 [A], and the maximum electric current value is set to 1.2 [A].

In such a configuration, the dulling controller 30 in the above-mentioned S16 sets the first electric current value to an added value that is a sum of the currently-output value and 0.2 [A], if the sum is still smaller than the maximum electric current value, or sets the first electric current value to the maximum electric current value, if the sum exceeds the maximum electric current value. Further, instead of adding a preset value to the currently-output value of the target electric current, the currently-output value may also be multiplied in a preset fold. That is, besides using a stored value in ROM, a value computed by an arithmetic operation may also be set as the first electric current value. Further, the modification in FIG. 8 about a target electric current increasing case may also be applied to a decreasing case in the same manner.

However, in the increasing case, the wave form of the dulled target electric current value is best fitted to the behavior of the actual electric current when the maximum electric current value is set as the first electric current value as described above. Therefore, in the increasing case, the first electric current value is preferably set to a value in a range between (i.e., equal to or greater than) the upper limit of the usage region and (i.e., equal to or smaller than) the maximum electric current value. In such a case, the first electric current value may be pre-stored in ROM, or the first electric current value may be arithmetically computed in an in-range value described above. Further, more preferably, the maximum electric current value is set as the first electric current value as described above.

Second Embodiment

In the present embodiment, a configuration same as the first embodiment will not be repeated for the description of the load drive controller 10.

Figure 9:
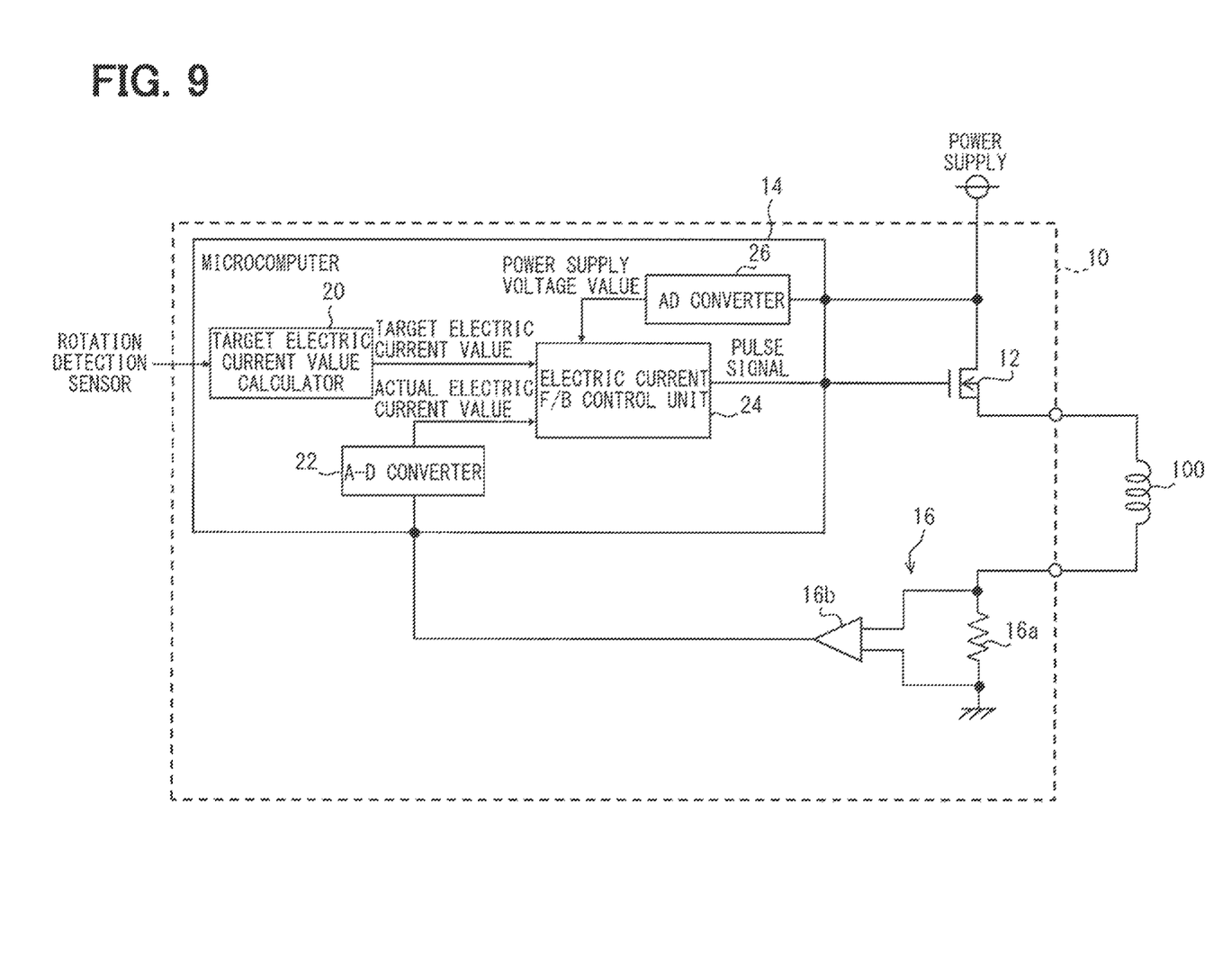
FIG. 9 is a schematic diagram of the load drive controlling device in a second embodiment of the present disclosure.

According to the present embodiment, the dulling controller 30 obtains a voltage value of the power supply which is a supply of an electric power to the linear solenoid 100 via the switch 12, and sets the first electric current value according to the obtained voltage value.

In addition to the configuration shown in the first embodiment, the load drive controller 10 in FIG. 9 is provided with an A-D converter 26. The A-D converter 26 has its input terminal electrically connected to a connection point between the power supply and the switch 12, and has its output terminal electrically connected to the electric current F/B controller 24.

Figure 10:
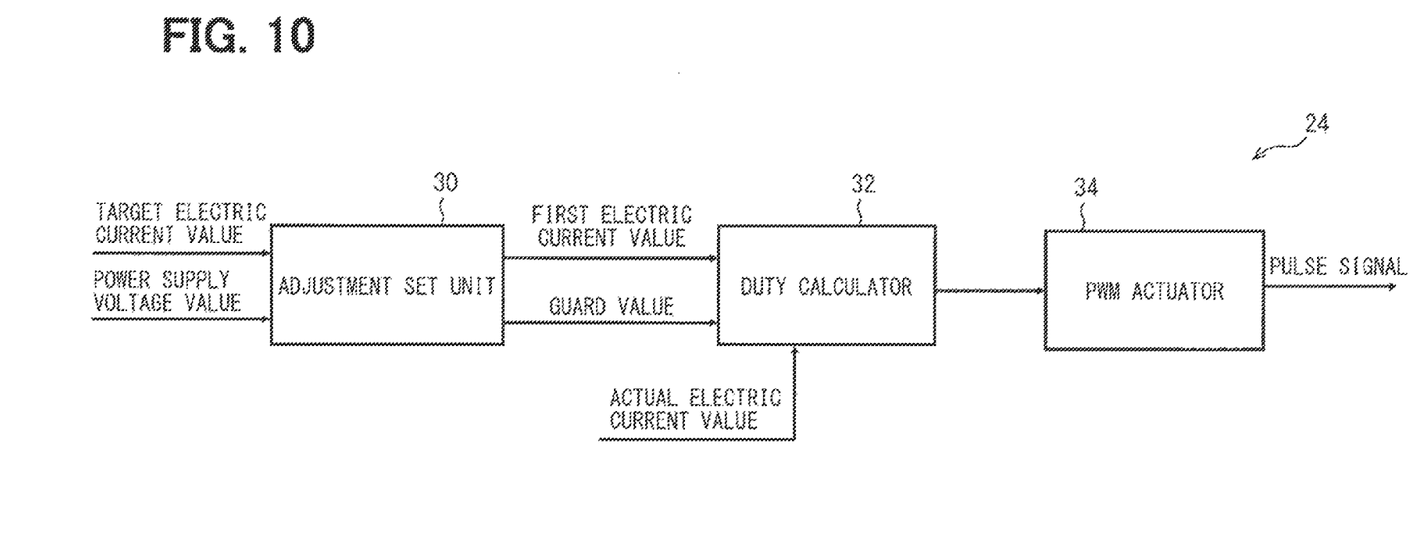
FIG. 10 is a schematic diagram of the electric current F/B controller in FIG. 9.

The dulling controller 30 of the electric current F/B controller 24 obtains the target electric current value from the target electric current value calculator 20, and obtains a power supply voltage value from the A-D converter 26, as shown in FIG. 10. Then, based on the target electric current value and the power supply voltage value, the first electric current value and the guard value are set.

Figure 11:
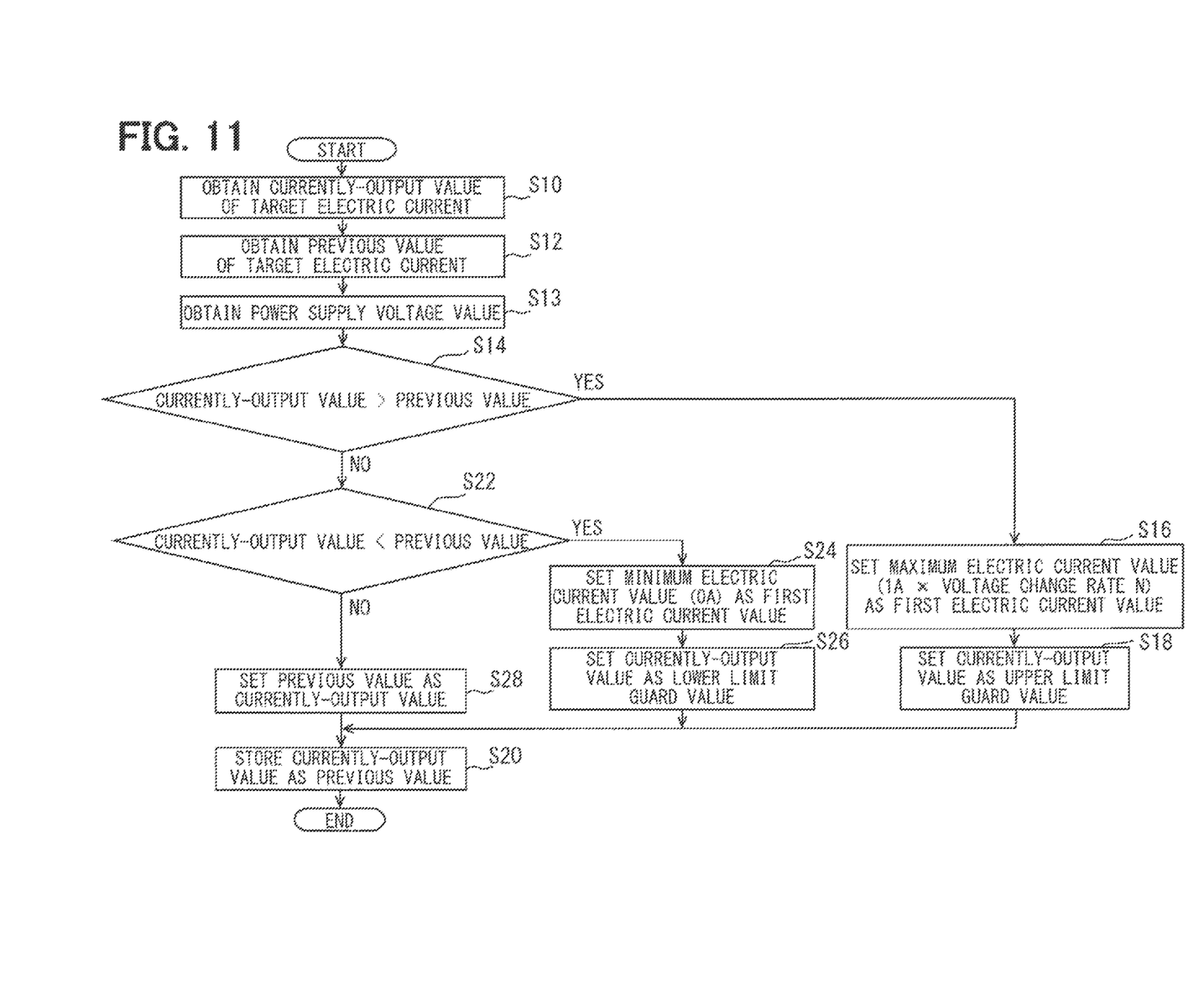
FIG. 11 is a flowchart of a process performed by the dulling controller of FIG. 10.

Next, with reference to FIG. 11, a process performed by the dulling controller 30 is described. The dulling controller 30 repeatedly executes the above process at a predetermined cycle, while the power supply of the microcomputer 14 is switched ON. In the process shown in FIG. 11, explanation is simplified about a portion which is in common with the first embodiment (FIG. 4).

As shown in FIG. 11, the dulling controller 30 obtains the currently-output value of the target electric current in the first place (S10), and then obtains the previous value of the target electric current (S12). Further, in the present embodiment, the power supply voltage value is obtained from the A-D converter 26 (S13).

Further, it is determined whether the currently-output value of the target electric current is greater than the previous value of the target electric current, i.e., whether the target electric current value is increasing (S14). When it is determined that the currently-output value of the target electric current is greater than the previous one in S14, the dulling controller 30 sets a multiplication product of the maximum electric current value and a change rate N of the power supply voltage value as the first electric current value that is output to the dulling adjuster 40. In other words, the maximum electric current value for the changed power supply voltage value is set as the first electric current value.

The maximum electric current value that is memorized in ROM in advance, which is a 1 [A] for example, is a target electric current value for a reference voltage value of the power supply voltage value, e.g., 14 [V]. Therefore, in the present embodiment, a change rate N (i.e., =the power supply voltage obtained in S13/the reference electric current value) of the power supply voltage value is used to correct/compensate the maximum electric current value. That is, the first electric current value is set according to the power supply voltage value, and is outputs to the dulling adjuster 40 (S16).

Description of steps S18-S28 will not be repeated, since the contents of those steps are same as the first embodiment.

Next, the advantageous effects of the load drive controller 10 concerning the present embodiment are described.

Change of the power supply voltage value will also change the rise/fall characteristic of the actual electric current flowing in the linear solenoid 100. In view of such, change of the power supply voltage value is taken into account for the setting of the first electric current value in the present embodiment. In other words, the setting of the first electric current value is matched to the changed characteristics of the actual electric current, the change of the characteristics caused by the change/fluctuation of the power supply voltage value.

Figure 12:
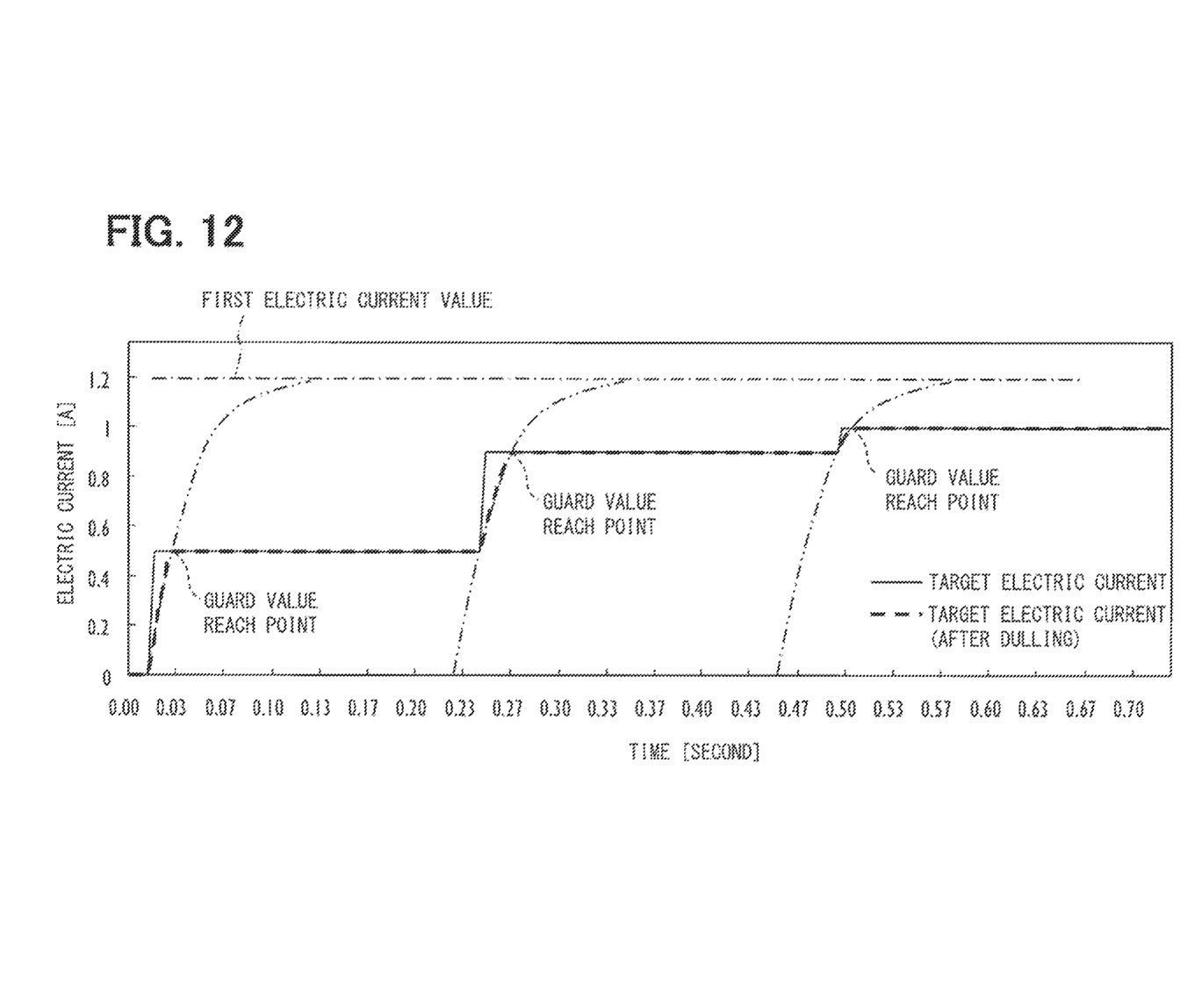
FIG. 12 is a graph of a dulling effect on the target electric current in the second embodiment.

According to the present embodiment, since the reference voltage is 14 [V] and the maximum electric current value is 1 [A], when the obtained power supply voltage value is 14 [V], the first electric current value is set to 1 [A]. On the other hand, when the obtained power supply voltage value is 16.8 [V], the first electric current value (i.e., the maximum electric current value) is set to 1.2 [A]. When the power supply voltage value is higher than the reference voltage value, the rise of the electric current is very steep, for example. However, according to the present embodiment, as shown in FIG. 12, the dulled target electric current is generated to match the characteristic of the actual electric current. Therefore, the wave form of the target electric current after the dulling operation is further fitted to the one of the actual electric current. In FIG. 12, an example in which the power supply voltage value is 16.8 [V] and the first electric current value is 1.2 [A] is shown.

Although the present disclosure has been fully described in connection with preferred embodiment thereof with reference to the accompanying drawings, it is to be noted that various changes and modifications will become apparent to those skilled in the art.

According to the present embodiment, the linear solenoid 100 of the oil pressure valve is described as a controller of the oil pressure of the automatic transmission, which serves as an inductive load. However, the inductive load is not necessarily limited to such. That is, as long as the drive of the inductive load is under PWM control, the load drive controller of the present disclosure is applicable.

Such changes, modifications, and summarized schemes are to be understood as being within the scope of the present disclosure as defined by appended claims.

What is claimed is:

1. A load drive controlling device for controlling a drive of an inductive load comprising:

a switch driven at a preset duty which controls an electric current flowing in the inductive load;

an actual electric current value detector detecting an actual electric current value flowing in the inductive load;

a dulling controller (i) setting a first electric current value for a dulling adjustment operation based on a change trend between a previous value and a current moment value of a target electric current of the inductive load, and (ii) setting the current moment value of the target electric current as a guard value;

a dulling adjuster (i) performing the dulling adjustment operation on the first electric current value, and (ii) limiting a dulled value based on the guard value;

a proportional integral (PI) controller (i) performing a proportional integral control based on a deviation between the dulled value that is output from the dulling adjuster and the actual electric current value, and (ii) setting the preset duty based on the proportional integral control, wherein when the change trend of the target electric current value is increasing, (i) the dulling controller sets a value greater than the current moment value of the target electric current as the first electric current value, which allows the first electric current value to increase to a maximum electric current value that is a 100% duty target electric current value, and (ii) the dulling controller sets the guard value as an upper limit value of the dulled value, and when the change trend of the target electric current value is decreasing, (i) the dulling controller sets a value smaller than the current moment value of the target electric current as the first electric current value, which allows the first electric current value to decrease to a minimum electric current value that is a 0% duty target electric current value, and (ii) the dulling controller sets the guard value as a lower limit value of the dulled value.

2. The load drive controlling device of claim 1, wherein when the change trend of the target electric current value is increasing, the dulling controller sets the first electric current value to a value that is in a range (i) equal to or greater than an upper limit of a usage region of the target electric current and (ii) equal to or smaller than the maximum electric current value.

3. The load drive controlling device of claim 2, wherein the dulling controller sets the first electric current value to the maximum electric current value.

4. The load drive controlling device of claim 1, wherein the dulling controller sets the first electric current value to the minimum electric current value when the change trend of the target electric current value is decreasing.

5. The load drive controlling device of claim 1, wherein the dulling controller continues to use a previously-set first electric current value and the guard value when the target electric current value is not changing.

6. The load drive controlling device of claim 1, wherein the dulling controller obtains a voltage value of a power supply that is supplied to the inductive load via the switch, and sets the first electric current value according to the obtained voltage value.

7. The load drive controlling device of claim 1, wherein the inductive load is a solenoid of an oil pressure valve.

* * * * *